(12) United States Patent
Ward et al.

(10) Patent No.: US 6,808,636 B2
(45) Date of Patent: Oct. 26, 2004

(54) TREATMENT OF SEWAGE SLUDGE

(75) Inventors: Owen P. Ward, Waterloo (CA); Henry Burd, Waterloo (CA)

(73) Assignee: Lystek International Inc., Waterloo (CA)

( * ) Notice: Subject to any disclaimer, the term of this patent is extended or adjusted under 35 U.S.C. 154(b) by 0 days.

(21) Appl. No.: 09/872,990

(22) Filed: May 31, 2001

(65) Prior Publication Data

US 2002/0185456 A1 Dec. 12, 2002

Related U.S. Application Data

(60) Provisional application No. 60/209,002, filed on Jun. 1, 2000.

(51) Int. Cl.[7] .............................................. C02F 11/14
(52) U.S. Cl. ............................... 210/710; 71/13; 71/22; 210/721; 210/725; 210/737; 210/738; 210/756; 210/764
(58) Field of Search ................................ 210/609, 631, 210/710, 737, 738, 752, 764, 667, 759, 760, 724, 725, 721, 756; 71/9, 13, 22

(56) References Cited

U.S. PATENT DOCUMENTS

| | | | | | |
|---|---|---|---|---|---|
| 4,471,916 | A | * | 9/1984 | Donaldson | 241/42 |
| 4,655,932 | A | * | 4/1987 | Roslonski | 588/204 |
| 4,781,842 | A | * | 11/1988 | Nicholson | 405/129.25 |
| 5,013,458 | A | * | 5/1991 | Christy et al. | 405/129.27 |
| 5,188,739 | A | | 2/1993 | Khan et al. | 210/770 |
| 5,188,741 | A | * | 2/1993 | Zang et al. | 210/774 |
| 5,234,468 | A | | 8/1993 | Khan | 48/197 |
| 5,234,469 | A | | 8/1993 | Khan et al. | 48/197 |
| 5,266,085 | A | * | 11/1993 | McMahon et al. | 48/197 R |
| 5,275,733 | A | * | 1/1994 | Burnham | 210/609 |
| 5,356,540 | A | * | 10/1994 | Khan et al. | 210/758 |
| 5,360,546 | A | | 11/1994 | Tomita et al. | 210/603 |
| 5,435,923 | A | | 7/1995 | Gerovich | |
| 5,603,842 | A | | 2/1997 | Whitaker et al. | 210/743 |
| 5,614,102 | A | | 3/1997 | Sakurada | 210/718 |
| 5,618,442 | A | * | 4/1997 | Christy | 210/742 |
| 5,679,262 | A | | 10/1997 | Gerovich et al. | |
| 5,681,481 | A | * | 10/1997 | Christy et al. | 210/723 |
| 5,770,056 | A | | 6/1998 | Deskins | 210/136 |
| 5,783,073 | A | | 7/1998 | Christy et al. | 210/205 |
| 5,851,404 | A | | 12/1998 | Christy et al. | 210/723 |
| 5,853,590 | A | * | 12/1998 | Burnham | 210/609 |
| 6,203,722 | B1 | * | 3/2001 | Hurst | 252/192 |

FOREIGN PATENT DOCUMENTS

| | | |
|---|---|---|
| CA | 1298419 | 3/1992 |
| CA | 1324449 | 11/1993 |
| CA | 2189472 | 11/1995 |
| CA | 2114583 | 9/1996 |

* cited by examiner

*Primary Examiner*—Peter A. Hruskoci
(74) *Attorney, Agent, or Firm*—Anthony Asquith & Co.

(57) ABSTRACT

A method for reducing sludge viscosity of a sewage sludge having a solids concentration of at least 10% (w/w). The method comprises the steps of increasing the pH of the sludge to 9.5–12.5%, at least one step selected from subjecting the sludge to a holding step of at least one day and adding inorganic or organic chemicals to facilitate viscosity reduction, followed by incubating the sludge at temperature up to 100° C., and subjecting the sludge to a shearing or disintegration step. The method provides sludge, especially concentrated sludge, that is more readily pumped or transported.

14 Claims, No Drawings

TREATMENT OF SEWAGE SLUDGE

This application claims the benefit of U.S. Provisional Application No. 60/209,002 filed Jun. 1, 2000.

FIELD OF THE INVENTION

The present invention relates to a method for treatment of sewage sludge and in particular to a method for reducing the viscosity of dewatered or concentrated sewage sludges having a solids concentration of at least 10% (w/w).

BACKGROUND OF THE INVENTION

Sewage sludges typically have concentrations of 0.5–3.0% (w/w) solids. The sludges may be thickened, with removal of water, by a variety of methods, including gravitational thickening, flotation thickening, centrifugation and screw and belt pressing. Surfactants may be added to sludge to facilitate particle flocculation as part of the steps to thicken or concentrate the sludge.

Sludges of about 3–5% (w/w) solids are sufficiently low in viscosity that they are still capable of being pumped, which facilitates transfer of the liquid sludges to and from storage and transporting tanks. In addition, the ability to pump sludges facilitates transfer of the sludges to land application equipment and also application of the liquid sludges to the land by surface spraying or subsurface injection.

There is substantial interest in concentrating liquid sludges, having 0.5–5% (w/w) solids, to reduce the volume of material required for transport, storage and/or further handling. However, the high viscosity of more concentrated sludges makes them less suitable for pumping, spraying and injection. It is also recognized that polymeric and other kinds of flocculating agents and conditioners, used to produce concentrated sludges, may also contribute to the increased viscosity of these sludges. Hence, there is a great interest in finding cost effective methods for reducing the viscosity of more concentrated sludges so that they are more easily pumped and/or sprayed and/or injected. and/or further processed.

U.S. Pat. No. 5,188,741 describes a process to treat sewage sludge to increase sludge solids content and to decrease viscosity, which includes a step of heating to about 500° F. (about 260° C.) at a pressure of 750 psig under a blanket of nitrogen. U.S. Pat. No. 5,783,073 describes a process and apparatus to liquefy sludges containing up to 10% solids at a pH of greater than 12. U.S. Pat. No. 5,618,442 describes a process for destroying harmful pathogens in sludge under alkaline conditions in a pasteurization chamber. U.S. Pat. No. 4,471,916 describes a process for reducing sludge viscosity involving mechanical treatment and addition of an alkali metal silicate. U.S. Pat. No. 5,356,540 describes a pumpable aqueous sewage composition that contains a non-ionic water-soluble alkoxylated alkyl phenol, and a process for preparing aqueous sewage sludge having a solids content of 30–65% by weight. U.S. Pat. No. 5,681,481 describes treatment of sewage sludge with a solids content of less than 10%, at a pH of 12.0 or higher for a period of time e.g. at least 50° C. for at least about 12.0 hours.

Methods described to date for producing low viscosity sewage sludge concentrates are either limited to the sludges having <10% solids content or are disadvantageous in that extreme conditions of temperature and/or pressure are required to reduce viscosity to facilitate pumping and/or land spraying and/or injection of the sludges.

SUMMARY OF THE INVENTION

An improved method has been developed for production of concentrated sludges having low viscosities.

Accordingly, one aspect of the present invention provides a method for reducing sludge viscosity of a sewage sludge having a solids concentration of at least 10% (w/w), comprising the steps of:
  (a) increasing the pH of the sludge to the range of 9.5–12.5;
  (b) selecting at least one step from
  (i) maintaining the sludge at the pH of (a) and at a temperature of 10–37° C. for a period of at least one day, and (ii) adding one or more inorganic or organic chemicals to the sludge, such chemicals contributing to viscosity reduction;
  (c) incubating the sludge by maintaining the resultant sludge at a temperature in the range of 40–100° C. for a period of time of at least one hour;
  (d) subjecting the sludge to physical shearing or disintegration; and
  (e) subsequently discharging the sludge.

In embodiments of the process of the present invention, step (b)(i) is selected, step (b)(ii) is selected or both step (b)(i) and step (b)(ii) are selected.

In the embodiment in which step (ii) is selected, at least one of a sodium or potassium salt is added, especially at least one of sodium or potassium chloride, optionally with addition of an oxidizing agent is added in step (c) e.g. sodium hypochlorite or hydrogen peroxide.

In another aspect of the present invention, a low viscosity sewage sludge is obtained, which may be further processed by physical, chemical and/or biological methods, may be applied to land by spraying, injection or other methods, or disposed by any method.

A further aspect of the present invention provides an apparatus for reducing the sludge viscosity of a sewage sludge, comprising:
  (a) a device for concentrating and/or dewatering the sludge;
  (b) a device in which the viscosity of the sludge obtained from the device of (a) is reduced;
  (c) a device to subject the sludge obtained from the device of (b) to shearing; and
  (d) means to control the flow and temperature of sludge, said means including means to subject the sludge to holding steps.

DETAILED DESCRIPTION OF THE INVENTION

The term "sewage sludge" as used herein may be broadly defined as "water-carried wastes", particularly from municipal sanitary sewage lines, containing one or more of body wastes, community waste such as street washings, etc., and industrial wastes and sludges. The total solids content of the sewage in municipal lines is usually about 0.5% w/w or more. The solids in sewage are mostly animal or vegetable substances, "organic matter", i.e., fats, carbohydrates, and proteins. Some mineral or inorganic constituents present include sand and clay, as well as the common mineral salts found in the water supply.

Sewage sludge contains raw sewage and may contain a number of pathogens known to be health hazards to humans. Almost any type of microorganism may be found in sewage, including bacteria, protozoans, viruses and fungi. It is understood that raw sewage would normally have been passed through screens for the removal of large pieces of stone, wood, metal, and other trash which would clog channels or damage pumps. Coarse heavy inorganic materials, i.e. gravel, cinders, and sand are allowed to settle out. A sewage in the form of an aqueous suspension of sewage sludge and liquids is obtained. Concentration of the sewage sludge may be accomplished by any suitable way for separating solids and liquids, e.g. gravity settlings, filtration, centrifugation, hydrocyclone, or a combination thereof. Preferred methods of concentration include use of a screw press, belt press or centrifuge, or use of pressure, vacuum, heat or evaporation. It is the concentrated material that is preferably subjected to the processes of the present invention. The sludge that is treated according to the process of the present invention has a solids concentration of at least 10% (w/w).

In the concentration of the sewage sludge, a flocculating agent may be added to facilitate the concentration of the sewage sludge. A wide variety of flocculants may be used. The flocculants may be anionic or cationic polyelectrolytes, and in the form of polymers, copolymers and polymeric mixtures. Examples of the flocculants include polymers containing acrylamides, acrylate, quaternary acrylates; poly-N-vinylformamides, polyethyleneimine, chitosan, carboxymethyl-celluloses or -starches, cationized celluloses or starches and sodium alginate. For instance, the flocculating agent may be a cationic polyacrylamide copolymer, e.g. Percol™ 757 cationic polyacrylamide copolymer. The flocculating agent, if used, is preferably used in concentrations of 0.01–0.05% w/v.

The pH of the concentrated sludge is adjusted by the addition of an alkaline material. The alkaline material may be any of a number of caustic compounds including mono- and di- valent hydroxides, especially alkali metal hydroxides. Examples include sodium and potassium hydroxide, soda ash, lime i.e. substantially pure calcium oxide, or other alkaline substances. The alkali may contain nitrogen. The selection may be dependent on availability and pH level desired e.g. sodium or potassium hydroxide may be required to obtain higher levels of pH.

The pH of the concentrated sludge is adjusted to the range of 9.5–12.5. In some jurisdictions, the pH of the sludge must be increased to at least 12.0 for a period of time. In such jurisdictions, compliance with regulations would be required. One such regulation is under the U.S. Environmental Protection Act, and requires municipalities to certify that treated sludge complies with all regulations. An example is the U.S. regulation of 40 C.F.R. Part 503.

It is preferred that the pH of the concentrated sludge be adjusted to the range of 10–12, especially 10.5–11.5. Thus, in the absence of regulations requiring use of a pH of at least 12, it is preferred to adjust the pH to the above ranges. If use of the higher pH is required, additional treatment at a pH of 10–12, especially 10.5–11.5, is preferred.

Subsequent to adjustment of the pH and prior to incubation, in one embodiment of the invention the solution of concentrated sludge is held for a period of time, especially held at ambient temperature and most particularly at 10–37° C. for a period of time. The period of time may be several days, especially at least one day and preferably 3–10 days. The solution may be held for longer periods of time, but practical considerations in doing so may be important.

If the solution of concentrated sludge is held for a period of time prior to incubation, the subsequent step of addition of chemicals to further facilitate reduction in viscosity may be eliminated in one embodiment of the invention. Alternatively, the solution may be held for a period of time and then the step of addition of chemicals may be carried out.

In a preferred embodiment of the invention, chemicals are added to the concentrated sludge after adjustment of the pH as described above, to further effect a reduction in the viscosity of the sludge. The chemicals are selected to increase the ionic strength of the sludge, which may reduce the ionic interactions between filaments and/or particles and/or polymers in the sludge. Examples of the chemicals include salts of alkali and alkaline earth metals. Examples of cations include lithium, sodium, potassium, zinc, magnesium, calcium and manganese. Examples of anions include nitrate, sulphate and phosphate. The chemicals optionally may contain nitrogen. In embodiments, the salts are sodium or potassium halides, especially sodium or potassium chloride. Examples of the concentration range of the chemical additives are 0.1–1.0% w/v.

In addition, or alternatively, an oxidizing chemical may be added to the sludge. Examples of the oxidizing chemicals include oxygen, chlorine, perchlorate, perchlorites e.g. NaOCl, hydrogen peroxide, nitric acid, sulphuric acid, potassium permanganate, sodium perborate and ozone. Such chemicals may be used at concentrations of for example 0.001–0.01% w/v.

The sludge at the adjusted pH is subjected to an incubation step. It is understood that the incubation step follows at least one of the holding step and the chemical addition step. The incubation step is carried out at a temperature in the range of 40–100° C. Preferably, the incubation step is carried out at a temperature of at least 50° C., and especially 60–80° C.

The incubation time will depend on the degree of reduction in viscosity to be attained and the temperature of the incubation step, and useful or optimal times may be determined. Longer times are required at lower temperatures. For instance, at 70° C. in an embodiment of the invention illustrated herein, incubation times of 0.5–8.0 hours effected substantial reductions in viscosity, especially times of 1.0–2.0 hours. Periods of time substantially longer than optimal times may not be very beneficial.

The sludge is also subjected to a shearing step, a particle size reduction process to reduce particle size and/or break up agglomerates of particles in the sludge. For example, the sludge may be sheared at a temperature of from ambient temperature to 100° C., and mostly preferably at about the temperature of the incubation step. The shearing step may be carried out simultaneously with and/or subsequent to the incubation step. In one embodiment, the shearing step is carried out simultaneously with the incubation step. In a preferred embodiment, the shearing step is carried out subsequent to the incubation step.

The shearing may take place in a high speed mixing apparatus equipped with one or more propellers, e.g. be effected mechanically by one or more high speed rotating blades. The blades may consist of turbine impellers or flat or toothed disks having high rotational speeds. Typical peripheral velocities of impellers used to achieve shearing are 1000–10,000 ft/min. or preferably 3000–6000 ft/min. Under these conditions, shearing may be carried out for 2 min to 2 hours. Other methods of shearing utilize high speed rotating blades within a cylindrical perforated grid which contributes to particle size reduction. Other systems reduce particles by application or release of pressure/vacuum, generation of cavitation forces in the sludge. Repeated freezing and thawing, passing sludge through small orifices causing abrasion, and passing frozen sludge under pressure through orifices where the ice crystals cause abrasion may be used The method of the present invention may be operated as a continuous process, a batch process or combination of continuous and batch steps.

The present invention provides a method for reducing the viscosity of sludges having a solids content of >10% w/w. The treated sludges that are obtained are more readily pumped and/or transported, and thus more suitable for disposal.

The present invention also provides an apparatus for reducing the sludge viscosity of a sewage sludge. The apparatus has a device for concentrating and/or dewatering the sludge. Examples of such devices include screw presses, belt presses, centrifuges and filtration units. The apparatus also has a device e.g. one or more vessels to subject the sludge to holding and/or incubation steps, in order to reduce the viscosity of the sludge. In addition, the apparatus has a device to subject the sludge to a shearing step. Examples of such devices include a rotating toothed disc or impeller, especially with a tip speed of 1000–10,000 ft/min. Suitable controls to cause flow of sludge, including holding steps, are provided.

The present invention is illustrated by the following examples.

EXAMPLE I

The influence of sludge solids concentration on sludge relative viscosity before and after a process involving alkali treatment, heat treatment and shearing was evaluated.

Sewage sludge was flocculated with 0.015% w/v Percol™ 757 cationic polyacrylamide copolymer water treatment flocculent to produce three different solids concentrations. The sludge concentrates were adjusted with sodium hydroxide to pH 10.91–11.07 and incubated at 70° C. for 18 h. The incubated sludges were then sheared by placing 100 ml in a Waring Biender Model 31BL92 with high speed blending for 2 minutes.

Relative viscosity was measured using a modified fabricated Ostwald and Auerbach viscometer. Because of the high viscosity of sludges and the presence of solids, the capillary connecting the graduated burette with the bore tube and funnel was replaced by a 4 mm internal diameter tube. The time in seconds required for 5 ml of sludge to flow through the system was recorded as relative viscosity. All measurements were conducted at 22° C.

The results are presented in Table 1.

TABLE 1

Influence of alkali treatment, incubation at 70° C. and shearing on sludges of different solids content.

| Sludge Solids Content | Relative Viscosity (sec.) | |
| --- | --- | --- |
| % w/w | Before Treatment | After Treatment |
| 13.99 | ∞* | >300** |
| 8.64 | ∞* | 62 |
| 6.24 | 84 | 7.5 |

22. Sludge did not flow through viscometer.
**Non-pumpable

The alkali treatment, incubation and shearing process substantially liquified and reduced the viscosity of sludge concentrates containing <10% w/w solids. The viscosity of the most concentrated sludge remained high and was considered not pumpable.

This example shows that the viscosity may be lowered without chemical treatment if the solids content is <10% w/w. However, at higher solids content, the viscosity was not lowered.

EXAMPLE II

The procedure of Example I was repeated, except that sodium chloride and/or sodium hypochlorite were added to pH-adjusted sludge concentrate prior to the incubation at 70° C. The results are given in Table 2.

TABLE 2

Influence of chemical supplements on reduction of viscosity of sludge concentrates.

| Sludge Concentration % w/w | Adjusted pH | Chemical Supplements | | Shearing Time (min.) | Relative Viscosity (sec.) |
| --- | --- | --- | --- | --- | --- |
| | | NaCl 0.5% w/v | NaOCl 0.004% w/v | | |
| 13.99 | 10.91–11.07 | yes | yes | 2 | 70 |
| 8.64 | 10.91–11.07 | yes | yes | 2 | 13 |
| 6.24 | 10.91–11.07 | yes | yes | 2 | 3.5 |
| 14.58 | 11.48 | no | no | 10 | 35 |
| 14.58 | 11.48 | no | yes | 10 | 36 |
| 14.58 | 11.48 | yes | no | 10 | 18 |
| 14.58 | 11.48 | yes | yes | 10 | 11 |

Incubation conditions 18 h at 70° C.

It was found that sodium chloride had a dramatic effect on reducing the relative viscosity of the treated sludge. However, when sodium hypochlorite was added in combination with sodium chloride, enhanced viscosity reduction was obtained. The dramatic viscosity reducing effects were observed at sludge concentrations of >10% w/w as well as at lower sludge concentrations.

This example in combination with Example I shows that addition of NaCl or combinations of NaCl and NaOCl cause reductions in the viscosity of the sludge when the solids content is >10% w/w. In addition, addition of NaCl and NaOCl effected lowering of the viscosity of sludge with a solids content of <10% w/w.

EXAMPLE III

Relative viscosities, measured by the methods described in Example I, were compared with viscosities in centipoise, measured using a rotary Fann viscometer. Operation of this viscometer at different speeds produces different shear rates. Shear stress was determined by measuring the torque on a concentric bob.

The viscosities of a sample of sludge having a concentration of 3% w/w was determined. Samples of the sludge were then flocculated to obtain a concentration of 15% w/w. Using the procedure of Example I, the pH of the concentrated sludge was adjusted to 11.02, and NaCl (0.5% w/v) and NaOCI (0.004% w/v) were then added. The sludge solution was then incubated at 70° for 18 hours. The resultant solution was subjected to shear using the blender of Example I.

A comparison of the viscosity results obtained in centipoise using the rotary Fann viscometer with the relative viscosities obtained with the modified Ostwald instrument is presented in Table 3 for the different sludge preparations.

TABLE 3

Comparison of viscosities (centipoise) measured with a rotary viscometer with relative viscosities determined with the modified Ostwald and Auerbach apparatus.

| Sludge Description | Rotary Viscosity | | Modified Ostwald Apparatus Relative Viscosity (sec) |
|---|---|---|---|
| | Shear Stress (1/sec) | Viscosity Centipoise | |
| Raw Sludge (3% w/w) | 355.49 | 9 | 4 |
| Flocculated sludge (15.02% w/w) pH 11.02 incubated with NaCl (0.5% w/v) and NaOCl (0.004% w/v) for 18 h at 70° C. | | | |
| With no shearing | 368.22 | 356 | ∞* |
| 3 minute shearing | 342.26 | 70 | 54 |
| 15 minute shearing | 361.21 | 28 | 14 |

22. Did not flow through apparatus

Literature values for viscosities of different sewage concentrates having 15% solids content range from 600–2,600 centipoise.

The result obtained in the absence of shearing is substantially lower than literature values for sludge at the same concentration, thereby showing the effect of the treatment steps prior to shearing.

This example also shows the effects of shearing of the treating sludge solution, and the substantial further lowering of viscosity that is obtained.

EXAMPLE IV

The pH of flocculated sludge, solids content 15.06% w/w, was adjusted with sodium hydroxide to pH 11.06. The sludge was incubated in the presence of 0.5% w/v NaCl and different concentrations of hydrogen peroxide for 20 h at 70° C., followed by shearing for 10 minutes.

The results are presented in Table 4.

TABLE 4

The influence of hydrogen peroxide on reduction of sludge viscosity.

| Hydrogen Peroxide (% w/v) | Viscosity (sec.) |
|---|---|
| — | 25 |
| 0.005 | 14 |
| 0.01 | 13 |
| 0.1 | 10 |
| 1.0 | 6.5 |

Addition of hydrogen peroxide effected further reduction in the viscosity of the sludge.

EXAMPLE V

The effects of shearing on relative viscosity of flocculated sludge concentrate (14% w/w) were investigated. The pH of the sludge was adjusted to 11.0 using NaOH. 0.5% w/v NaCl and 0.004% w/v NaOCl were then added. The sludge was incubated at 70° C. for 2 h, and then subjected to a shearing step. Relative viscosity was then measured using the procedure of Example I.

The results obtained are given in Table 5.

TABLE 5

Effect of shearing on reduction of viscosity of flocculated sludge.

| Shearing Time (min.) | Relative Viscosity (sec.) |
|---|---|
| 0 | ∞* |
| 3 | 70 |
| 6 | 41 |
| 9 | 20 |
| 12 | 10 |
| 15 | 9 |

22. Did not flow through apparatus.

A substantial reduction in relative viscosity was observed, especially for shearing times of up to 12 minutes.

EXAMPLE VI

The effects of pH on viscosity reduction of flocculated sludge concentrate (14.56% w/w), were studied. The pH-adjusted concentrates were incubated with sodium chloride (0.05% w/v) and NaOCl (0.004% w/v) at 70° C. for 20 h, followed by shearing for 10 minutes.

The results obtained are given in Table 6.

TABLE 6

Influence of pH adjustment of viscosity reduction of flocculated sludges incubated with chemical supplements at 70° C. and then sheared.

| PH Adjusted to | Relative Viscosity (sec.) |
|---|---|
| 8.64 | ∞* |
| 10.50 | 21 |
| 11.17 | 16 |
| 12.02 | 77 |
| 12.73 | 200 |

*Did not flow through apparatus.

The relative viscosity of the treated sludge solutions decreased as the pH of the sludge concentrates was increased, until the pH reached about 11. Increases in pH to 12 or higher resulted in a lower reduction in viscosity.

EXAMPLE VII

The effects of incubation temperature on reduction of sludge viscosity were determined. The concentration of the flocculated sludge solids concentration was 14.2% w/w. The pH of the sludge was adjusted to 11.13. The sludge was treated with NaCl (0.5% w/v) and NaOCl (0.004% w/v), and incubated at each temperature for 20 h. The sludges obtained were then sheared for 5 minutes and relative viscosities were measured at 22° C., using the procedure of Example I.

The results are given in Table 7.

TABLE 7

Effect of incubation temperature on reduction of viscosity of flocculated sludge treated with alkali and chemical supplements and then sheared.

| Incubation Temperature (° C.) | Relative Viscosity (sec.) |
|---|---|
| 20 | ∞* |
| 50 | 61 |
| 60 | 23 |
| 70 | 11 |
| 80 | 41 |
| 90 | 45 |
| 120** | 53 |

TABLE 7-continued

Effect of incubation temperature on reduction of viscosity of flocculated sludge treated with alkali and chemical supplements and then sheared.

| Incubation Temperature (° C.) | Relative Viscosity (sec.) |
|---|---|

22. Did not flow through apparatus
**Held at 120° C. for 2 hours.

Increases in incubation temperature from ambient temperature (20° C.) resulted in decreased relative viscosity, until the temperature reached 70° C. However, further increases in temperature were less effective in reducing the relative viscosity of the treated sludge.

EXAMPLE VIII

The pH of flocculated sludge concentrate (10.49% w/w) was adjusted to 10.5 with sodium hydroxide. The sludge was then incubated with 0.5% w/v NaCl and 0.004% w/v NaOCl at 70° C. for different times periods, followed by shearing for 5 minutes. Relative viscosity was measured using the procedure of Example I.

The results obtained are presented in Table 8.

TABLE 8

Influence of incubation time on reduction of sludge viscosity.

| Incubation Time (hours) | Sludge Relative Viscosity (sec.) |
|---|---|
| 0 | ∞* |
| 0.5 | 24 |
| 1.0 | 16 |
| 2.0 | 11 |
| 8.0 | 9.5 |
| 20.0 | 10.5 |

22. Did not flow through apparatus

A substantial reduction in relative viscosity was obtained in 0.5 hours, and the reduction in viscosity increased as the time increased, especially up to a treatment time of 2 hours. Further increase in time gave minimal further reduction in relative viscosity.

EXAMPLE IX

The effect of holding the pH adjusted sludge concentrate at room temperature for a period of 5 days prior to further treatment was investigated. The sludge solids content was 13.86% w/w and pH was adjusted to 11.15.

In the first run, the pH of the sludge was adjusted, and relative viscosity was measured immediately and after holdings for 5 days at ambient temperature. All samples were subjected to shearing for 10 minutes.

In the second run, the pH of the sludge was adjusted and samples were either (i) immediately subjected to incubation at 70° C. for 20 hours followed by shearing for 10 minutes, or (ii) held for 5 days at ambient temperature (20° C.) and then subjected to incubation at 70° C. for 20 hours and shearing for 10 minutes.

In the third run, the procedure of the second run was repeated, except 0.05% NaCl (w/v) was added prior to the 70° C./20 h incubation.

In the fourth run, the procedure of the second run was repeated, except that 0.5% NaCl (w/v) and 0.004% NaOCl (w/v) were added prior to the 70° C./20 h incubation.

The results obtained are shown in Table 9.

TABLE 9

Effect of holding pH adjusted sludge for 5 days during treatment process.

| | Relative Viscosity (sec.) | |
|---|---|---|
| Treatment | No Holding | 5-day Holding |
| 1. pH adjustment, shearing for 10 min. | ∞ | ∞ |
| 2. pH adjustment, incubation at 70° C./20 h, shearing for 10 min. | 41 | 10 |
| 3. pH adjustment, 0.5% NaCl (w/v)added prior to incubation at 70° C./20 h, shearing for 10 minutes | 18 | 6.5 |
| 4. pH adjustment, 0.5% NaCl (w/v) plus 0.004% NaOCl added prior to incubation at 70° C./20 h, shearing for 10 minutes | 8 | 6.0 |

A dramatic reduction in sludge viscosity is obtained by holding the pH adjusted sludge for a period of 5 days prior to incubation and shearing. This occurred in the absence of NaCl or NaCl/NaOCl. Addition of NaCl and NaCl/NaOCl resulted in a further reduction in relative viscosity.

What is claimed is:

1. A method for reducing sludge viscosity of a sewage sludge having a solids concentration of at least ten percent by weight, being sewage sludge that, prior to use of the method, is so viscous as to be non-pumpable, the method comprising:
   (a) increasing the pH of the sludge to the range of 9.5 to 11.5;
   (b) maintaining the sludge at the pH of (a) and at a temperature of 10° C. to 37° C. for a period of at least one day;
   (c) incubating the sludge by maintaining the resultant sludge at a temperature in the range of 4° C. to 100° C. for a period of time of at least one hour;
   (d) subjecting the sludge to such physical shearing or disintegration as to transform the sludge front being non-pumpable to being pumpable;
   (e) subsequently discharging the sludge;
   and carrying out the step (d) no later than simultaneously with the step (c).

2. The method of claim 1 in which the solids concentration of at least ten percent is obtained using a screw press, belt press or a centrifuge.

3. The method of claim 1 in which the sludge pH is adjusted to at least 10.5.

4. The method of claim 1 in which the sludge is held in step (c) at a temperature and for a time sufficient to eliminate microbial pathogens.

5. The method of claim 1 in which the pH is increased using a mono or divalent hydroxide.

6. The method of claim 5 in which the pH is increased using lime.

7. The method of claim 1 in which some or all of the shearing of step (d) is effected by the action of pumps.

8. The method of claim 1 in which at least one of the treatments occurs in a batch procedure.

9. The method of claim 1, in which at least one of the treatments occurs in a continuous procedure.

10. Method of claim 1, wherein the shearing is done vigorously enough to ensure substantial reduction of particle size and physical breakup of agglomerates of particles in the sludge.

11. Method of claim 10, wherein the shearing is done using a rotating toothed disc or impeller, having a tip speed of 1000 to 10,000 feet/minute.

12. Method of claim 1, including carrying out the step (d) sequentially after the step (a).

13. Method of claim 1, wherein the sludge having a solids concentration of at least ten percent by weight is sludge that has been de-watered from a lower solids concentration, and wherein the step of de-watering includes passing the sludge through at least one of: a screw press; a belt press; a centrifuge; or a filtration unit.

14. Method of claim 1, including starting step (d) after the temperature of the sludge exceeds 40 deg C and after the pH of the sludge exceeds 9.5.

* * * * *